(12) United States Patent
Muse et al.

(10) Patent No.: US 7,967,152 B2
(45) Date of Patent: Jun. 28, 2011

(54) FLUID FILTER SUPPORT LAYER

(75) Inventors: Robert E. Muse, Cookeville, TN (US); James O. Stuart, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 1324 days.

(21) Appl. No.: 11/531,204

(22) Filed: Sep. 12, 2006

(65) Prior Publication Data

US 2008/0061009 A1    Mar. 13, 2008

(51) Int. Cl.
*B01D 27/06* (2006.01)
*B01D 24/00* (2006.01)

(52) U.S. Cl. .................. 210/493.1; 210/493.5; 210/505; 210/489; 156/73.1; 156/163

(58) Field of Classification Search .................. 210/487, 210/488, 493.1, 493.5, 499, 505, 489, 492, 210/767; 264/203, DIG. 48; 96/67; 156/163, 156/73.1
See application file for complete search history.

(56) References Cited

U.S. PATENT DOCUMENTS

| | | | | |
|---|---|---|---|---|
| 3,537,945 A | * | 11/1970 | Summers | 428/109 |
| 4,033,881 A | | 7/1977 | Pall | |
| 4,154,688 A | * | 5/1979 | Pall | 210/487 |
| 4,479,874 A | * | 10/1984 | Rosenberg et al. | 210/445 |
| 4,728,349 A | | 3/1988 | Oshitari | |
| 4,751,901 A | * | 6/1988 | Moor | 123/196 A |
| 4,961,974 A | | 10/1990 | Jones | |
| 5,028,465 A | | 7/1991 | Kinsley, Jr. | |
| 5,198,292 A | * | 3/1993 | Lerner et al. | 442/97 |
| 5,252,207 A | * | 10/1993 | Miller et al. | 210/335 |
| 5,543,047 A | | 8/1996 | Stoyell et al. | |
| 5,552,048 A | * | 9/1996 | Miller et al. | 210/489 |
| 5,591,335 A | | 1/1997 | Barboza et al. | |
| 5,725,821 A | * | 3/1998 | Gannon et al. | 264/203 |
| 5,990,377 A | * | 11/1999 | Chen et al. | 604/381 |
| 6,440,266 B1 | | 8/2002 | George et al. | |
| 6,527,954 B1 | * | 3/2003 | Furuhashi | 210/315 |
| 6,579,350 B2 | * | 6/2003 | Doherty | 96/67 |
| 6,840,387 B2 | | 1/2005 | Beer et al. | |
| 6,910,589 B1 | * | 6/2005 | Rose et al. | 210/484 |
| 7,033,497 B1 | * | 4/2006 | Yamaguchi et al. | 210/315 |
| 7,144,533 B2 | * | 12/2006 | Koslow | 264/49 |
| 2004/0060858 A1 | | 4/2004 | Lucas et al. | |
| 2008/0061009 A1 | * | 3/2008 | Muse et al. | 210/767 |

* cited by examiner

*Primary Examiner* — Ana M Fortuna
(74) *Attorney, Agent, or Firm* — Hamre, Schumann, Mueller & Larson, P.C.; J. Bruce Schelkopf

(57) ABSTRACT

An apparatus, system and method to facilitate fluid flow across a filter. The apparatus includes a filtration layer coupled to a support layer to form a composite filter. The support layer includes a hydroentangled cellulosic material forming a plurality of apertures. The apertures form channels to facilitate fluid flow across the filter while the support layer provides structural support to the filtration layer to enable lateral flow while preventing pleat deformation and collapse.

21 Claims, 7 Drawing Sheets

FLUID FILTER SUPPORT LAYER

BACKGROUND OF THE INVENTION

1. Field of the Invention

This invention relates to filtration systems, and more particularly relates to a support layer for a filter that maximizes fluid flow and throughput performance.

2. Description of the Related Art

Like gasoline, petrodiesel, or simply "diesel," is typically produced through a refining and distillation process from crude petroleum oils. Diesel, however, contains about eighteen percent (18%) more energy per unit of volume than gasoline. This attribute, along with the greater efficiency of diesel engines, contributes to greater fuel economy in diesel vehicles.

On the other hand, diesel is about eighteen percent (18%) heavier than gasoline, which may cause problems for diesel vehicles not typical of gasoline vehicles. Particularly, operation in cold weather may cause diesel components to crystallize, thereby restricting fuel flow at the filters. While diesel additives may modify the size and shape of crystals that precipitate out of the fuel and/or delay their agglomeration at low temperatures to facilitate fuel throughput, high efficiency filters may have a negative effect on flow and throughput performance, particularly under cold weather conditions.

A typical fuel filter includes an outer layer that encapsulates an inner filtration media having one or more layers. This depth media-type filter generally exhibits high efficiency and capacity while effectively confining contaminants in the filter. Such a filter may be pleated to effectively increase filter capacity by maximizing available filtration surface area. Capacity may be further increased by reducing the thickness of the layers to enable tighter packed pleats. Such high capacity filters may result in restricted flow paths that are inadequate to enable cold flow, particularly in diesel systems.

Similarly, lube oil filters depend on adequate flow paths to ensure sufficient lubrication and low pressure drop. A certain amount of oil pressure is needed to circulate oil throughout the engine and maintain lubrication. Primary filters, or full-flow filters, must operate largely without restriction or oil will not flow into the engine during cold start-ups. Accordingly, full-flow filters allow passage of comparatively small contaminants to avoid flow restriction.

While a secondary filter may compensate for reduced efficiency by subjecting a small portion of normal oil flow to more efficient media to remove particulate contamination, the potential catastrophic effect of pressure drop is of paramount importance. Therefore, if blockage occurs in the primary filter, bypass valves open to enable oil to bypass the filter and return to the engine unfiltered. In this situation, lubrication with unfiltered oil is better than none at all.

To reduce flow restriction in fuel and lube oil filters, various support layers have been developed to attach to the filtration media to minimize pleat deformation and collapse. A metal screen, for example, may be implemented to provide increased rigidity to the filtration media while allowing for fluid flow thereacross. Similarly, a synthetic support layer, such as extruded polymer netting, may be implemented for increased structural support. These solutions, however, are often both costly to manufacture and difficult to implement.

Indeed, synthetic materials are inherently costly, rendering a support layer made therefrom likewise costly. Strands of metal used to create a support layer may snag or tangle in the filtration media, delaying production and increasing labor and resources necessary for proper manufacture.

Similarly, stray wire from metal screens may interfere with efficient production by getting caught in the filtration media. Metal screens may also dull equipment needed to size the support layer to appropriate dimensions. Further, metal screens are not incinerable and thereby complicate disposal of the filter after use.

Accordingly, what is needed is a filter media support layer that facilitates flow across a filter and that is inexpensive to manufacture. Beneficially, such a filter media support layer would facilitate filter disposal, enable effective small particle filtration and minimize pressure drop across the filter. Such a filter media support layer is disclosed and claimed herein.

SUMMARY OF THE INVENTION

The present invention has been developed in response to the present state of the art, and in particular, in response to the problems and needs in the art that have not yet been fully solved by currently available fluid filter media support layers. Accordingly, the present invention has been developed to provide a fluid filter media support layer that overcomes many or all of the above-discussed shortcomings in the art.

An apparatus to facilitate flow across a filter in accordance with certain embodiments of the present invention includes a filtration layer and a support layer. The support layer may be positioned downstream from the filtration layer and adhesively bonded thereto. In one embodiment, the apparatus further includes one or more protective layers coupled to the filtration layer. The filtration layer, support layer and/or protective layer may form a composite filter adapted to filter a fluid such as fuel, oil, coolant, gas, air or water.

In some embodiments, the support layer includes a hydroentangled cellulosic material having multiple apertures, where the apertures provide channels to facilitate fluid flow across the filter. The plurality of apertures may occupy between about twenty-five percent and about eighty-five percent of the surface area of the support layer to maximize fluid flow. In one embodiment, a portion of the plurality of apertures is partially occluded by support layer fibers to provide increased structural support to the filtration layer.

In addition, the hydroentangled cellulosic material may minimize pressure drop across the filter by providing structural separation between filter pleats. In this manner, the hydroentangled cellulosic material may prevent pleat deformation and/or pleat collapse and enable lateral fluid flow.

The support layer may also include a substantially stable thermoplastic polymer and, in some embodiments, includes a saturant to provide increased structural support. The saturant may include, for example, a solvent-based phenolic resin, a water-based phenolic resin, polyvinyl acetate, epoxy and/or melamine, and may be provided in an amount up to about fifty percent by support layer weight.

A system of the present invention is also presented to facilitate flow across a filter. The system may be embodied by a filter cartridge adapted to direct a flow of fluid thereacross and a filter substantially housed within the filter cartridge to filter the flow of fluid. The filter may include a filtration layer and a support layer. The support layer may include a hydroentangled cellulosic material forming multiple apertures, where the apertures provide channels to facilitate the flow of fluid across the filter. As in the apparatus, the support layer may further include a saturant to provide increased structural support to the filtration layer.

In one embodiment, the filter is a composite pleated filter having numerous longitudinally extending pleats. The hydroentangled cellulosic material may include a depth and rigidity sufficient to prevent pleat deformation, enhance and maintain pleat separation, and promote lateral fluid flow. In some embodiments, for example, the depth of the material may be included in a range between about 0.025 inches and 0.050 inches. The rigidity of the material may be defined by a machine-direction (MD) Gurley stiffness in a range between about 1000 and 3000 mg and a cross-direction (CD) Gurley stiffness in a range between about 500 and 1500 mg.

A method of the present invention is also presented to facilitate flow across a filter. In one embodiment, the method includes providing a cellulosic material and hydroentangling the material to form a support layer. The support layer may include multiple apertures providing channels to facilitate a flow of fluid in a direction substantially perpendicular to the filter. The method may further include saturating the support layer with a resin and attaching the support layer to a filtration layer. The support layer and filtration layer may form a composite filter adapted to facilitate lateral and perpendicular fluid flow. In some embodiments, the method may include pleating the filter to maximize a surface area thereof.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are disclosed to provide a thorough understanding of embodiments of the present invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used in this specification, the term "fluid" refers to a continuous amorphous substance that tends to flow and to conform to the shape of its container. A fluid may include any liquid or gas such as oil, fuel, coolant, water, air and/or any other fluid known to those in the art. The term "phenolic resin" or "phenolic" refers to a thermosetting resin produced by the condensation of phenol with an aldehyde, such as formaldehyde. The term "filter cartridge" refers to any disposable or reusable housing adapted to contain a fluid filter. A filter cartridge may be encased by an outer casing and/or lid, or may stand alone. The term "lateral flow" or "lateral direction" refers to fluid flow in a downstream direction away from a fluid filter and toward a target device.

Figure 1:
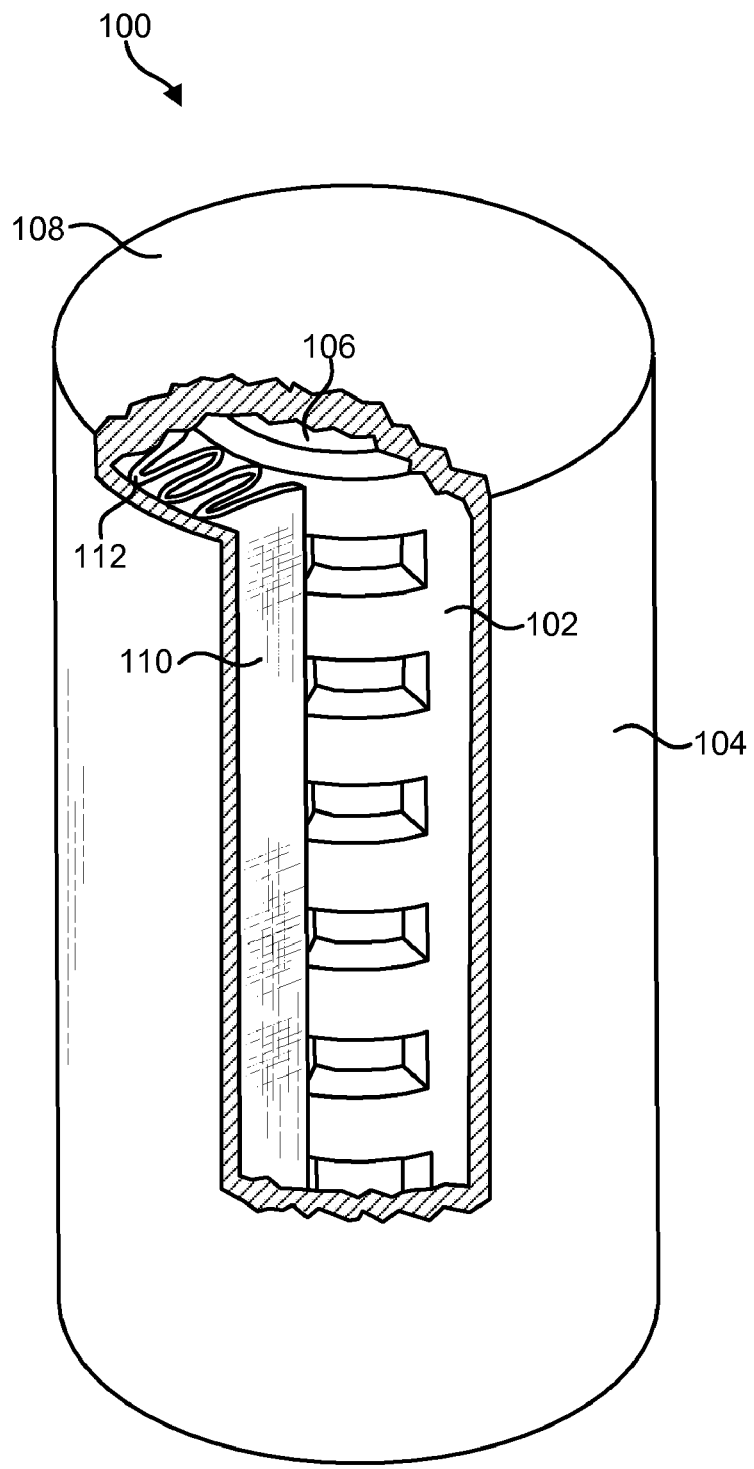
FIG. 1 is a perspective view, partially cutaway, of a filter cartridge incorporating a pleated filter in accordance with certain embodiments of the present invention.

FIG. 1 illustrates an exemplary filter cartridge 100 incorporating a fluid filter 110 in accordance with the present invention. A filter cartridge 100 may be manufactured of heavy gage steel, or any other substantially wear-resistant, chemical-resistant material known to those in the art. The filter cartridge 100 may include an outer wall 102 and an inner wall 104, where the outer and inner walls 102 and 104 are maintained in a substantially parallel, fixed relationship. In one embodiment, the outer and inner walls 104 and 102 are substantially cylindrical, where the inner wall 102 defines a hollow chamber 106 adapted to accommodate a flow of filtered fluid to a target device. Alternatively, the outer and inner walls 104 and 102 may include a conical, planar, or other geometry known to those in the art.

A distance between the inner and outer walls 102 and 104 may be fixed to accommodate a fluid filter 110. The fluid filter 110 may include a plurality of longitudinally extending, radial pleats 112 to maximize a filtration surface area, thereby increasing filter contaminant capacity. Alternatively, the fluid filter 110 may include W-pleats, spiral pleats or any other type of pleats known to those in the art. The fluid filter 110 may be interposed between the inner and outer walls 102 and 104 such that a width of each pleat 112 substantially corresponds to the distance between the inner and outer walls 102 and 104. In this manner, the inner and outer walls 102 and 104 may facilitate maintenance and support of the filter's 110 pleated configuration. In some embodiments, the ends of the pleats 112 may be sealed by an end cap 108 to prevent unfiltered fluid from bypassing the fluid filter 110.

In one embodiment, the filter cartridge 100 may be removably mounted within a filter casing (not shown). The filter casing may include a gasket to provide an exterior seal between the filter casing and a target device. In some embodiments, the filter casing may further include a mounting plate to prevent deflection at the gasket-sealing surface. The casing and outer wall 104 may cooperate to direct a flow of fluid to a designated inlet in communication with the fluid filter 110. Specifically, the outer wall 104 may include a substantially fluid-impervious material, such as heavy gage steel or the like, so as to direct a flow of fluid between the outer casing and the outer wall 104 to the designated inlet. Alternatively, the outer wall 104 may include a plurality of apertures to permit a substantially free flow of fluid into the filter 110.

Likewise, the inner wall 102 may be perforated to enable filtered fluid to freely permeate the inner wall 102 and be received into the hollow chamber 106. Alternatively, the inner wall 102 may be substantially impervious to the fluid so as to direct a flow of filtered fluid between the inner wall 102 and the fluid filter 110 to a designated outlet in communication with the hollow chamber 106.

Figure 2:
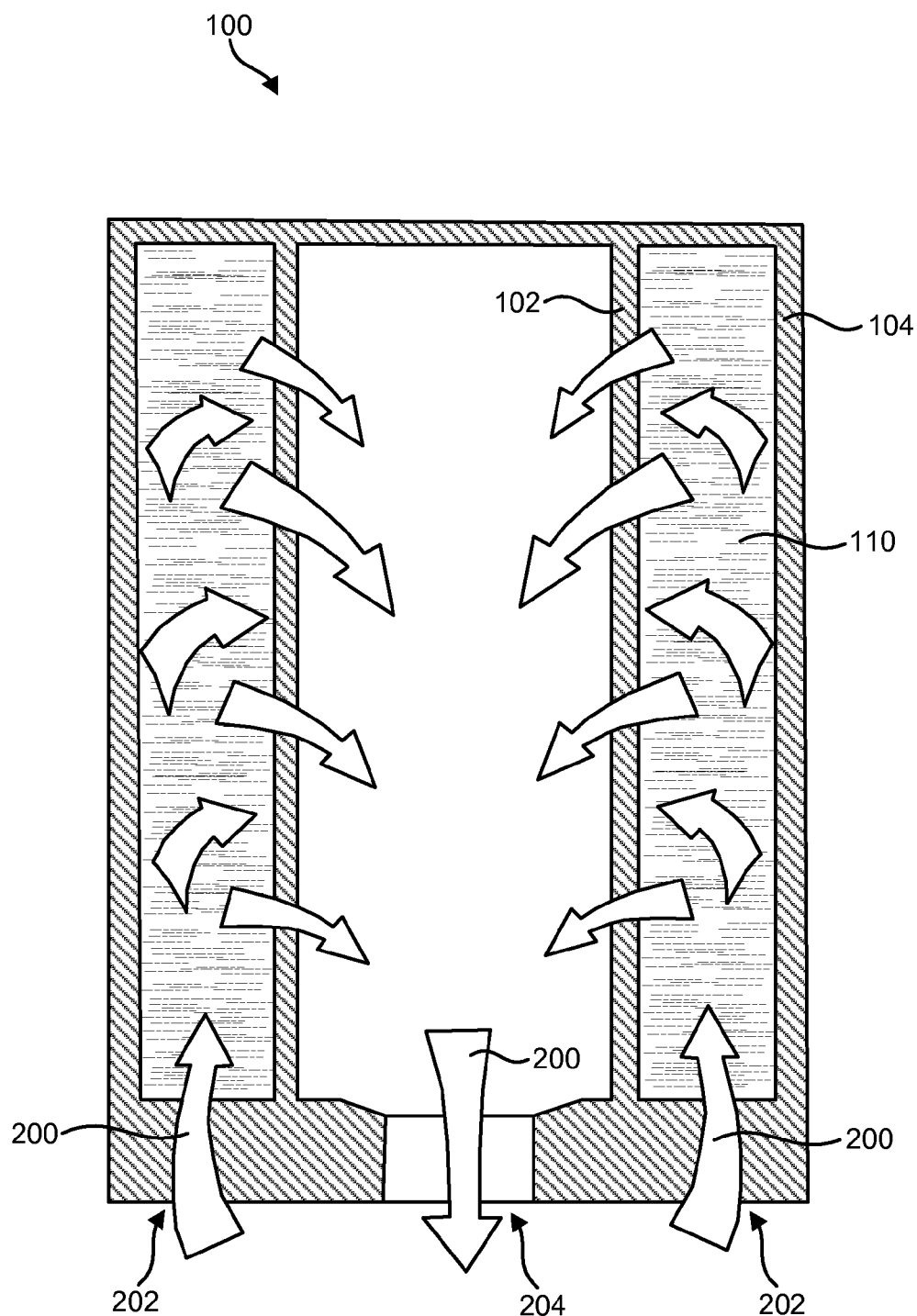
FIG. 2 is a cross-sectional view of a filter cartridge and pleated filter showing a direction of fluid flow therethrough.

FIG. 2 illustrates a flow of fluid through an exemplary filter cartridge 100 in accordance with certain embodiments of the present invention. Particularly, fluid 200 may enter the fluid cartridge 100 at a point of entry 202 under pressure from a pump (not shown). A pump may include, for example, an oil pump, a fuel pump, a hydraulic pump, or any other pump known to those in the art. The fluid 200 may then traverse the fluid filter 110 in a radially inward direction for collection into the hollow chamber 106. The filtered fluid 200 may then exit the filter cartridge 100 by way of a point of exit 204 in communication with a target device.

Of course, one skilled in the art will recognize that a direction of fluid flow may vary as needed to accommodate any particular filter cartridge 100 and/or fluid filter 110 configuration. For example, as discussed with reference to FIG. 1 above, a flow of fluid may be directed from a point of entry 202 to a point of exit 204 in a radially inward or outward direction, vertical direction, horizontal direction, or any other direction known to those in the art, as defined by filter cartridge 100 structure. Likewise, the pleat or other configuration of the fluid filter 110 may necessitate a direction of fluid flow other than that shown in FIG. 2 to facilitate graded filtration of the fluid 200 in a direction from coarse to fine. In this manner, increasingly smaller contaminants may be successively filtered from the fluid 200 with a high level of efficiency.

Figure 3:
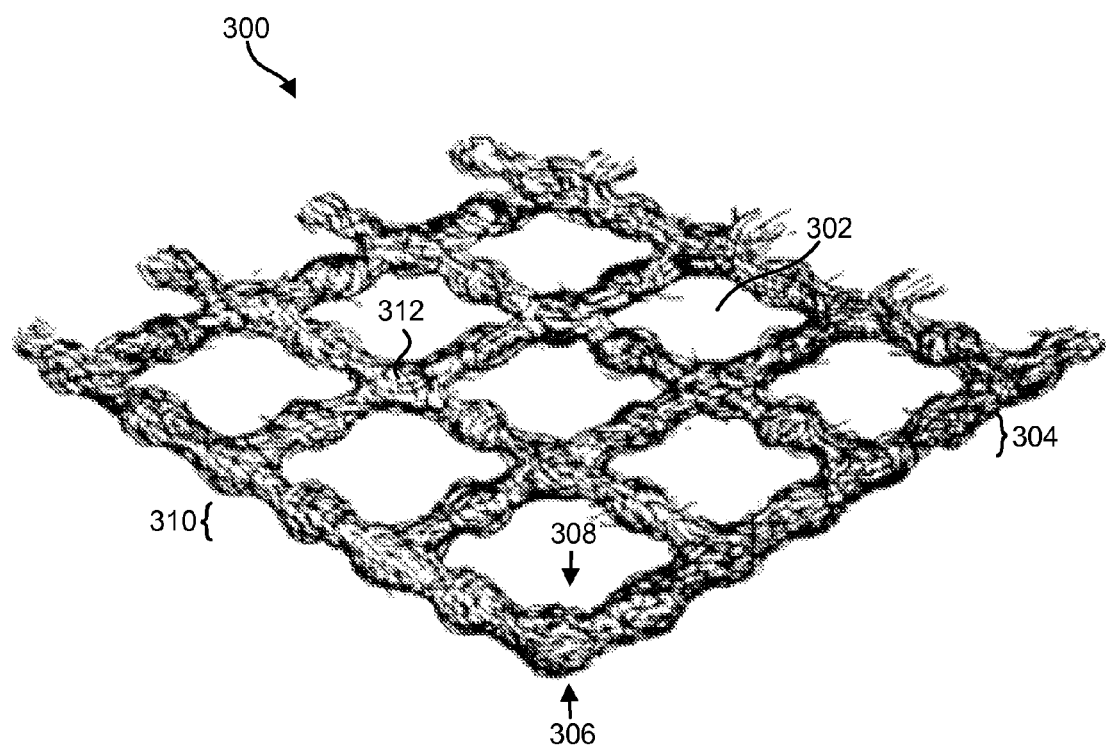
FIG. 3 is a perspective view of one embodiment of a fluid filter support layer in accordance with the present invention.

Referring now to FIG. 3, a fluid filter 110 in accordance with the present invention may include a support layer 300 to strengthen the filter 110 and increase fluid 204 throughput. Indeed, the relative weakness of the filter 110 may result in pleat deformation, compression, and collapse upon subjection to a fluid 200 under pressure. Such pleat deformation and collapse effectively reduces the amount of surface area for filtration and fluid 200 throughput, thus further increasing a differential pressure across the filter 110. The support layer 300 may prevent this result by providing increased structural integrity to the fluid filter 110.

Specifically, the support layer 300 may comprise a fibrous, cellulosic material and, in some embodiments, a thermoplastic polymer. The support layer 300 may include cellulose in an amount up to one hundred percent by support layer 300 weight. In one embodiment, cellulose is present in a range between about thirty and ninety percent (30%-90%) by support layer 300 weight. Similarly, the support layer 300 may include a thermoplastic polymer such as polyester, nylon, or any other thermoplastic polymer known to those in the art. The thermoplastic polymer may be present in an amount up to about forty percent (40%) by support layer 300 weight. In one embodiment, the thermoplastic polymer comprises about twenty percent (20%) by support layer 300 weight.

Traditionally, metal screens or woven or non-woven synthetic materials have been implemented to support a fluid filter 110. Such materials, however, are often both costly to manufacture and difficult to implement. Indeed, synthetic materials are inherently costly, resulting in a support layer that is also costly. Methods of manufacture also contribute to the expense associated with known support layers. Stray wire from metal screens, for example, often snags or tangles in the filter 110, delaying production and increasing labor and resources necessary for proper manufacture. Similarly, traditional metal support materials may dull equipment needed to size the support layer 300 to appropriate dimensions.

The cellulosic material of the present invention, however, effectively avoids such costs and obstacles. Indeed, cellulosic material manufacture is inherently inexpensive, sustained by low raw material costs, high-speed processing, and few manufacturing steps. In one embodiment, the cellulosic material may be wet-laid and hydroentangled to produce the support layer 300 of the present invention. This method of manufacture enables the support layer 300 to bond directly in-line with the filter 110 by ultrasonic, adhesive, or other attachment means known to those in the art. Alternatively, the support layer 300 and filter 110 may not be bonded at all. Additionally, the cellulosic composition of the support layer 300 prevents damage to manufacturing equipment during production and renders the composite filter 110 completely incinerable. This feature enables efficient disposal not possible in conventional filter systems.

In some embodiments, the wet-laid cellulosic material may be hydroentangled to both condense the wet-laid web and form apertures 302 therein. In a hydroentangling process in accordance with the present invention, fine columnar streams of water impinge wet-laid, cellulosic material carried by an apertured or patterned conveying means. The streams of water displace and condense interlayer fibers as a result of interlayer fiber friction. Further, the streams of water form within the material apertures 302 substantially corresponding to the apertured conveying means. Specific characteristics of the apertures 302 can be controlled by the design of the conveying means or hydroentangling belt, as well as by the placement and operational parameters of the water jets.

This process produces a high-loft support layer 300, having substantial air space between the fibers throughout the depth of the support layer 300. In some embodiments, the overall or maximum depth 310 of the support layer 300 may range between about 0.025 inches and 0.050 inches. This high loft enables the support layer 300 to effectively separate adjacent filter pleats 112 to enable lateral fluid flow, while the apertures 302 provide channels to facilitate fluid flow in a direction substantially perpendicular to the filter 110, as discussed in more detail with reference to FIG. 7 below. A minimum depth 312 of the support layer 300 may range between about 0.015 inches and 0.035 inches.

The support layer profile 304 further facilitates pleat 112 integrity and low pressure drop across the filter 110. Indeed, the support layer 300 generally comprises a first side 306 and a second side 308. The first side 306 may be substantially planar as it rests in contact with the apertured hydroentangling belt or forming wire during manufacture. The second side 308, on the other hand, may be substantially uneven and/or vary in texture according to a fiber displacement pattern resulting from the hydroentangling process. This variance in depth and texture optimizes pleat 112 support by enabling the lateral flow and drainage of fluid away from the filter 110.

To maximize effective fluid flow across the filter 110, in a direction substantially perpendicular thereto, the apertures 302 may be formed to occupy a substantial portion of the support layer 300. In one embodiment, for example, the apertures 302 occupy twenty-five to eighty-five percent (25%-85%) of the total support layer 300 surface area. In alternative embodiments, the apertures 302 occupy twenty-five to fifty percent (25%-50%) of the surface area. In some embodiments, aperture width may range between about 0.025 inches and 0.1 inches.

In some embodiments, the support layer 300 may be infused with a resin or saturant (not shown) in an amount up to about fifty percent (50%) by support layer 300 weight. Where the support layer 300 comprises a cellulosic material as discussed above, the cellulosic fibers may facilitate absorption of the saturant. The saturant may comprise, for example, a solvent-based phenolic resin, a water-based phenolic resin, polyvinyl acetate ("PVA"), epoxy, melamine, or any other saturant or resin known to those in the art capable of increasing the structural integrity and/or rigidity of the support layer 300. In one embodiment, addition of the saturant may result in the support layer 300 having a machine-direction ("MD") Gurley™ stiffness in a range between about fifteen hundred and three thousand milliNewton meters (1000 mg-3000 mg) and a cross-direction ("CD") Gurley™ stiffness ranging between about five hundred and fifteen hundred milliNewton meters (500 mg-1500 mg).

Figure 4:
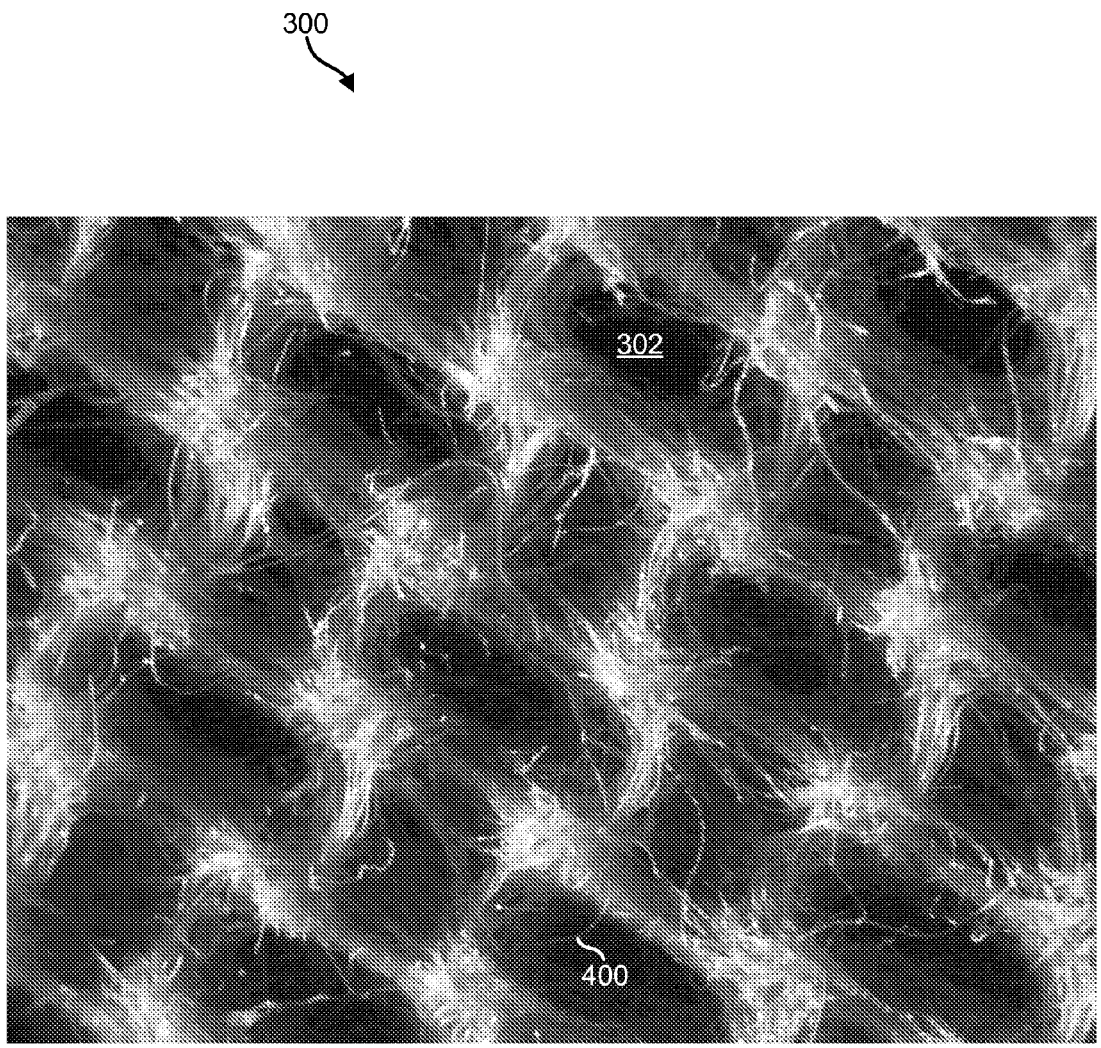
FIG. 4 is a photograph showing a highly magnified perspective view of an alternative embodiment of the fluid filter support layer.

Referring now to FIG. 4, the hydroentangling process used to form the support layer apertures 302 may produce stray or bridging fibers 400 that partially or wholly occlude certain apertures 302 formed thereby. Bridging fibers 400 typically do not cause substantial interference with the flow of fluid and are therefore of little concern as they relate to flow restriction. In fact, such fibers may be advantageous in that they provide increased structural support to the fluid filter 110. Indeed, in some embodiments, manufacturing parameters may be adjusted to occlude or reduce the quantity or dimensions of apertures 302 formed in the support layer 300 to provide increased structural support as needed to support a structurally weak filter 110.

Figure 5:
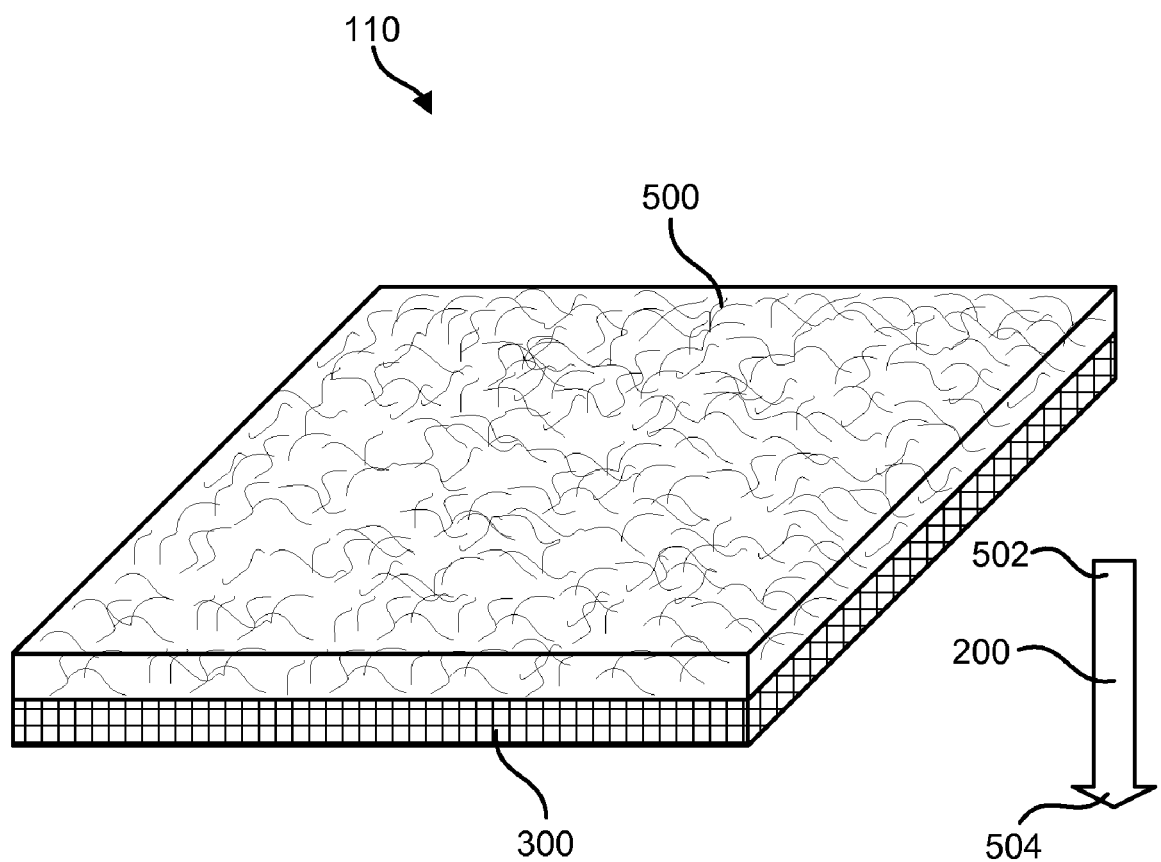
FIG. 5 is a cross-sectional view of a composite filter incorporating one embodiment of a fluid filter support layer in accordance with the present invention.

Referring now to FIG. 5, the support layer 300 may be attached to a filtration layer 500 to create a composite fluid filter 110. In one embodiment, the support layer 300 is attached to reside in a position downstream 504 from the filtration layer 500 such that the support layer 300 provides structural support and channels a flow of fluid across the filter 110 without impeding efficient fluid filtration through the filtration layer 500. As mentioned above, the support layer 300 may be ultrasonically bonded to the filtration layer 500, or may be adhesively bonded by way of roll coating, gravure, spray or the like. Alternatively, the support layer 300 may be bonded to the filtration layer 500 by any other means known to those in the art, or not bonded at all.

A filtration layer 500 in accordance with the present invention may comprise a single layer or multiple layers of a filtration medium comprising, for example, polybutylene terephthalate (PBT), polyethylene terephthalate (PET), nylon, polypropylene (PP), polyphenylene sulfide (PPS), acetal, or any other filtration medium known to those in the art. Each layer of the filtration medium may include uniform or varying porosities.

In one embodiment, a filtration layer 500 may comprise multiple meltblown layers (not shown) of varying porosity. The term "meltblown" refers to a process where a thermoplastic filament strand is subjected to high velocity gas that attenuates the filament and breaks it down into microfibers. As the fibers move toward a collecting screen, the ambient air cools and solidifies the fibers into a self-bonded, non-woven web. Variation in porosity of the meltblown layers produces corresponding variation in interstitial or pore size, thus providing varying layer filtration capabilities. This method of relying on porosity or density gradient variation to vary layer filtration capability facilitates an effective depth-media type filter 110.

Figure 6:
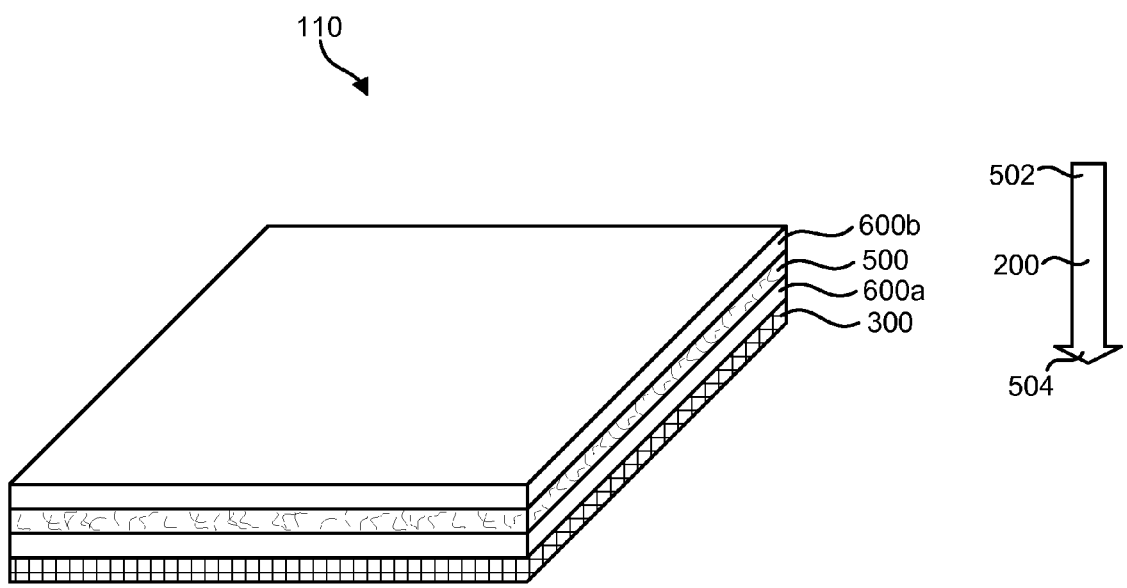
FIG. 6 is a cross-sectional view of an alternative embodiment of a composite filter in accordance with the present invention.

Referring now to FIG. 6, in some embodiments, the filtration layer 500 may be coupled to at least one protective layer 600 adapted to protect meltblown layers during processing and prevent their migration during use. The protective layer 600 may comprise a spunbonded filtration medium, where extruded, spun filaments are deposited onto a collecting belt in a uniform random manner and thermally bonded together. In certain embodiments, the protective layer 600 may comprise spunbonded polybutylene terephthalate (PBT), polyethylene terephthalate (PET), nylon, polypropylene (PP), polyphenylene sulfide (PPS), acetal, Teflon®, or any other spunbonded filtration medium known to those in the art.

The protective layer 600 may be ultrasonically bonded to the filtration layer 500, or may be attached to the filtration layer 500 by any other means known to those in the art. In certain embodiments, the filtration layer 500 may be sandwiched between two protective layers 600a and 600b to substantially encapsulate the more delicate filtration layer 500.

In some embodiments, the protective layer 600 may comprise a porosity greater than a porosity corresponding to the filtration layer 500. In this manner, the protective layer 600 may provide preliminary filtration of relatively large particulate matter from a fluid 200, thereby contributing to overall filtration while protecting the more delicate filtration layer 500.

Figure 7:
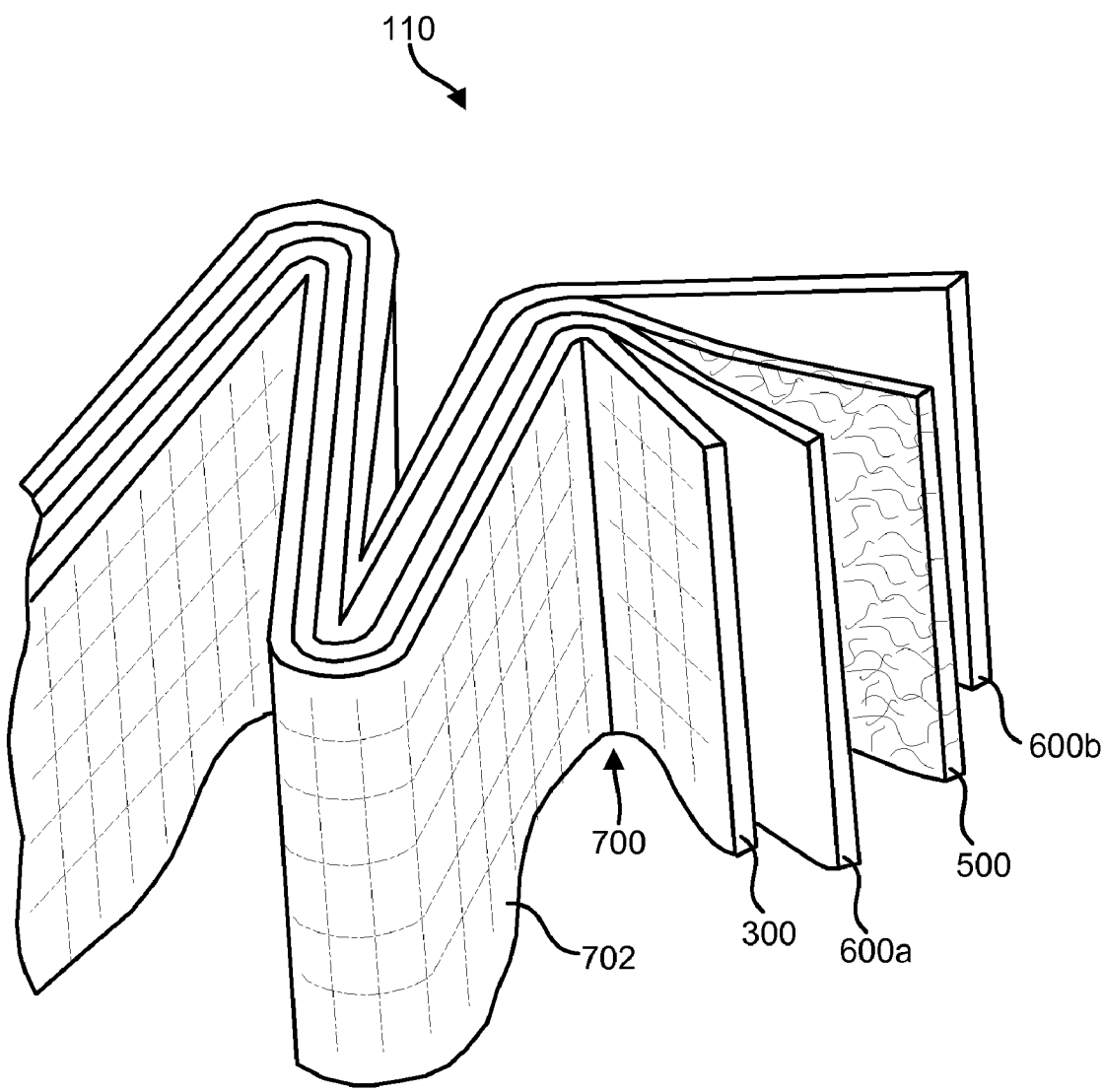
FIG. 7 is a cross-sectional view of a pleated filter incorporating a fluid filter support layer in accordance with the present invention.

Referring now to FIG. 7, the support layer 300 of the present invention may increase structural integrity of the filter 110 by providing a substantially rigid filter interface 700 at every pleat 112. Increased structural integrity may be particularly noticed at every other pleat 112, where the filter interface 700 comprises opposing support layers 300.

Indeed, as discussed above with reference to FIG. 3, the hydroentangling process provides a high-loft, apertured support layer 300 that enables both lateral and perpendicular fluid flow. Specifically, the high loft of the support layer 300 enables fluid drainage away from the filter 110 between filter pleats 112. This feature is especially important where pleats become pinched due to imperfect pleat pack geometry, high number of pleats, or collapsed pleats at high pressure drop.

Where opposing support layers 300 interface 700, the loft is effectively doubled. At such an interface 700, therefore, pleat 112 stability is maximized. In this manner, the high-loft support layer 300 optimizes lateral fluid flow while reducing pleat deformation and collapse.

The support layer 300 may also promote fluid flow in a direction substantially perpendicular to the filter 110, enabling flow of low restriction through the filter 110. Apertures 302 integrated into the support layer 300 provide channels 702 to facilitate fluid flow across the filter 110. As discussed above with reference to FIG. 2, the channels 702 may direct a flow of filtered fluid 200 through the apertures 302 toward the inner wall 102 of the filter cartridge. The fluid may then enter a hollow chamber 106 via perforations in the inner wall 102, to be finally circulated to a target device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to facilitate flow across a filter, comprising:
   a filtration layer to filter a fluid; and
   a support layer coupled to the filtration layer and positioned downstream therefrom, the support layer comprising a hydroentangled cellulosic material forming a plurality of apertures, the plurality of apertures providing channels to facilitate fluid flow across the filter,
   wherein the support layer includes bridging fibers that partially or wholly occlude portion of the plurality of apertures to provide structural support to the filtration layer.

2. The apparatus of claim 1, wherein the filtration layer is one of adhesively bonded, ultrasonically bonded, and not bonded to the support layer.

3. The apparatus of claim 1, wherein the hydroentangled cellulosic material is adapted to enable lateral fluid flow.

4. The apparatus of claim 1, wherein the hydroentangled cellulosic material further comprises a substantially stable thermoplastic polymer.

5. The apparatus of claim 1, wherein the hydroentangled cellulosic material further comprises a saturant to provide increased structural support.

6. The apparatus of claim 5, wherein the saturant is selected from the group consisting of a solvent-based phenolic resin, a water-based phenolic resin, polyvinyl acetate, epoxy and melamine.

7. The apparatus of claim 5, wherein the saturant is provided in an amount up to about fifty percent by support layer weight.

8. The apparatus of claim 1, wherein the plurality of apertures comprise between about twenty-five percent and about eighty-five percent of a surface area of the support layer.

9. The apparatus of claim 1, wherein the fluid is selected from the group consisting of a fuel, an oil, a coolant, a gas, air and water.

10. The apparatus of claim 1, wherein the filtration layer comprises multiple layers with varying porosity.

11. The apparatus of claim 1, wherein the filtration layer and support layer comprise a composite pleated filter having a plurality of longitudinally extending pleats.

12. The apparatus of claim 11, wherein the filtration layer is sandwiched between two protective layers, each protective layer comprising a porosity greater than a porosity of the filtration layer.

13. The apparatus of claim 11, wherein the filtration layer is coupled to a protective layer having a porosity greater than a porosity of the filtration layer.

14. A system to facilitate flow across a filter, comprising:
   a filter cartridge adapted to direct a flow of fluid thereacross;
   a filter substantially housed within the filter cartridge to filter the flow of fluid, the filter comprising:
      a filtration layer; and
      a support layer coupled to the filtration layer, the support layer comprising a hydroentangled cellulosic material forming a plurality of apertures, the plurality of apertures providing channels to facilitate the flow of fluid across the filter,
   wherein the filtration layer is sandwiched between two protective layers, each protective layer having a porosity greater than a porosity of the filtration layer, and
   wherein the support layer includes bridging fibers that partially or wholly occlude a portion of the plurality of apertures to provide structural support to the filtration layer.

15. The system of claim 14, wherein the filter comprises a composite pleated filter having a plurality of longitudinally extending pleats.

16. The apparatus of claim 15, wherein the filter cartridge comprises an inner wall and an outer wall; wherein a width of each pleat substantially corresponds to a distance between the inner and outer walls.

17. The apparatus of claim 16, wherein the inner wall comprises a plurality of perforations adapted to facilitate fluid flow into a hollow chamber formed by the inner wall.

18. The system of claim 15, wherein the hydroentangled cellulosic material comprises a depth and a rigidity sufficient to enable lateral fluid flow between the plurality of longitudinally extending pleats.

19. The system of claim 18, wherein the depth comprises a range between about 0.025 inches and 0.050 inches.

20. The system of claim 18, wherein the rigidity comprises a machine direction (MD) Gurley stiffness in a range between about 1000 and 3000 mg and a cross-direction (CD) Gurley stiffness in a range between about 500 and 1500 mg.

21. The system of claim 14, wherein the hydroentangled cellulosic material further comprises a saturant to provide increased structural support to the filtration layer.

* * * * *